United States Patent [19]

Miki et al.

[11] Patent Number: 4,465,303
[45] Date of Patent: Aug. 14, 1984

[54] SEAT BELT ARRANGEMENT FOR AUTOMOTIVE VEHICLE

[75] Inventors: Hiroyuki Miki, Sagamihara; Hiroo Okuyama, Yokohama, both of Japan

[73] Assignee: Nissan Motor Company, Limited, Kanagawa, Japan

[21] Appl. No.: 426,171

[22] Filed: Sep. 28, 1982

[30] Foreign Application Priority Data

Oct. 12, 1981 [JP] Japan .............................. 56-160973

[51] Int. Cl.³ ...................... B60R 21/02; B60R 21/10
[52] U.S. Cl. .................................. 280/804; 280/808; 297/483
[58] Field of Search ................. 280/804, 808; 297/483

[56] References Cited

U.S. PATENT DOCUMENTS

| 4,056,271 | 11/1977 | Imabuchi et al. | 280/804 |
| 4,061,365 | 12/1977 | Nagano et al. | 280/804 |
| 4,072,323 | 12/1978 | Shimokawa et al. | 280/804 |
| 4,401,321 | 8/1983 | Suzuki et al. | 280/804 |

Primary Examiner—Richard A. Bertsch

[57] ABSTRACT

A seat belt arrangement for an automotive vehicle having a seat structure, a roof side rail and a center pillar, comprising a guide rail extending along the roof side rail, a slide member slidably received in a downwardly open longitudinal groove in the guide rail and protruding downwardly from the groove, a retaining strap anchored at one end to the slide member and extending in part in front of the seat structure, a retractor unit adapted to pull the strap to wind it into roll form, and a strap guide member having an upper bracket portion secured to the roof side rail and a lower portion extending downwardly from the bracket portion along the center pillar. The slide member is movable forwardly and rearwardly through the groove in the guide rail, and the arm portion of the slide member extends through a gap formed between the center pillar and the guide member. The guide member is secured to the roof side rail by fastening elements which have not only the guide member but also the guide rail securely attached to the roof side rail. The bracket portion of the guide member upwardly terminates below the upper end of the roof side rail.

5 Claims, 5 Drawing Figures

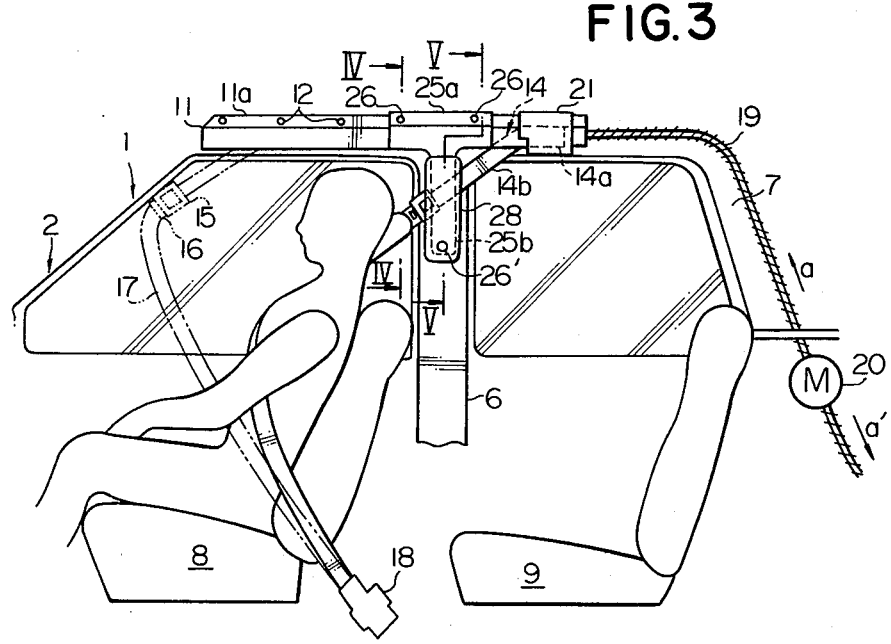
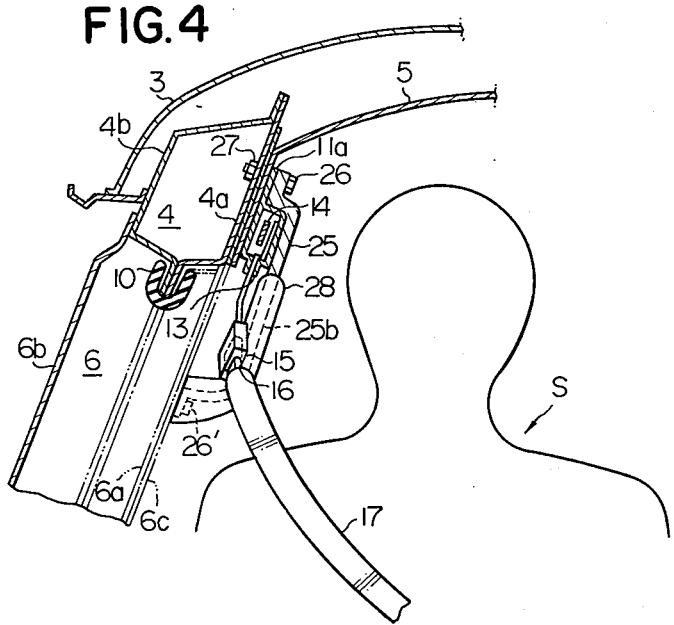
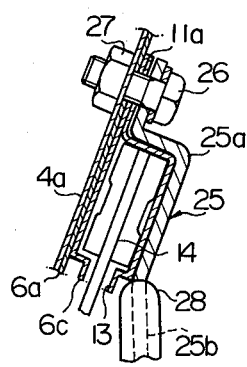

SEAT BELT ARRANGEMENT FOR AUTOMOTIVE VEHICLE

FIELD OF THE INVENTION

The present invention relates to a protective seat belt arrangement for use in an automotive vehicle to protect an occupant of a seat structure of the vehicle from an injury during a frontal collision of the vehicle.

SUMMARY OF THE INVENTION

In accordance with the present invention, there is provided a protective seat belt arrangement for use in an automotive vehicle including a seat structure, a first structural member longitudinally extending in a fore-and-aft direction of the vehicle, a second structural member extending downwardly from the first structural member, and a stationary member fixedly held in the vehicle body, the protective seat belt arrangement comprising a guide rail longitudinally extending along and fixedly attached first fastening means to the first structural member and formed with a longitudinal groove which is open downwardly; a slide member in part slidably received in the groove in the guide rail and in part protruding downwardly from the guide rail through the open lower end of the groove in the guide rail; a retaining strap anchored at one end thereof to the slide member and longitudinally extending in part in front of the seat back of the seat structure; a retractor unit secured to the above mentioned stationary member and adapted to pull the retaining strap and to have the retaining strap wound into roll form therein, the retaining strap being anchored at the other end thereof to the retractor unit; drive means operable for driving the slide member to move forwardly and rearwardly through the groove in the guide rail; and a strap guide member having an upper bracket portion fixedly attached to the first structural member by second fastening means and a lower strip portion extending downwardly from the upper bracket portion along the second structural member and fixedly attached to the second structural member, the arm portion of the slide member extending through a gap formed between the second structural member and the lower strip portion of the strap guide member. The seat belt arrangement according to the present invention is characterized in that the second fastening means has not only the strap guide member but also the guide rail secured to the first structural member and further in that the upper bracket portion of the strap guide member upwardly terminates slightly below the upper end of the first structural member. The seat belt arrangement according to the present invention is further characterized in that the second fastening means has not only the strap guide member but also the guide member secured to the first structural member and in that the upper bracket portion of the strap guide member is securely attached to the first structural member by the above mentioned second fastening means in such a manner that a portion of the guide rail is closely held between the bracket portion and the first structural member. The first structural member may be constituted by a roof side rail longitudinally extending along each side edge of the roof panel of the vehicle while the second structural member may be constituted by a center pillar extending downwardly from the roof side rail.

BRIEF DESCRIPTION OF THE DRAWINGS

The drawbacks of a known protective seat belt arrangement and the features and advantages of a protective seat belt arrangement according to the present invention will be more clearly understood from the following description taken in conjunction with the accompanying drawings in which:

FIG. 3 is a view similar to FIG. 1 but shows a preferred embodiment of a protective seat belt arrangement according to the present invention;

FIG. 4 is a sectional view taken on a vertical plane indicated by line IV—IV in FIG. 3; and FIG. 5 is a sectional view taken on vertical planes indicated by lines V—V in FIG. 3.

DESCRIPTION OF THE PRIOR ART

Figure 1:
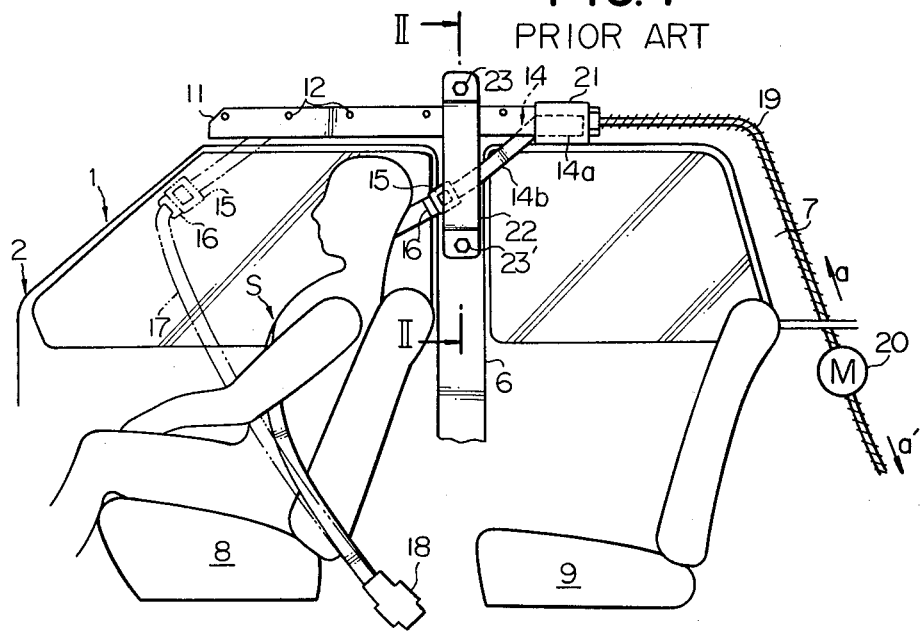
FIG. 1 is a side elevation view showing a prior-art protective seat belt arrangement for use in an automotive vehicle.
Figure 2:
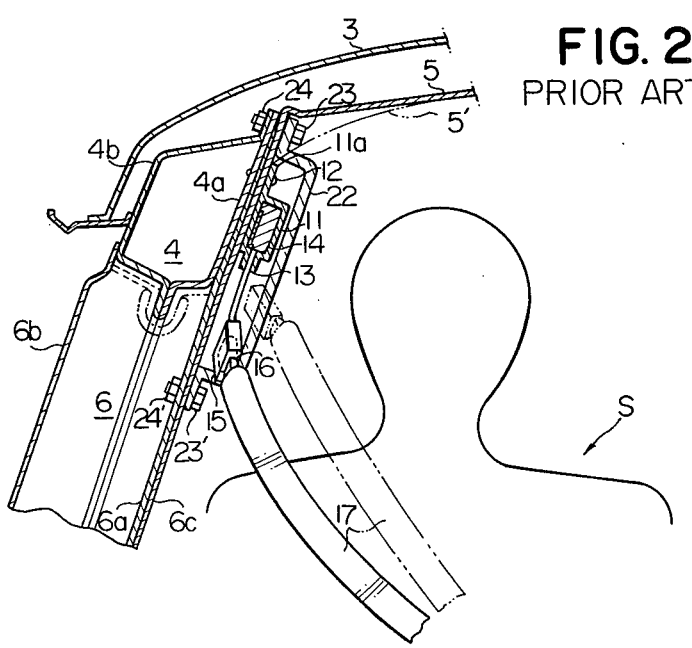
FIG. 2 is a sectional view taken on a vertical plane indicated by line II—II in FIG. 1.

Referring to FIGS. 1 and 2 of the drawings, a prior-art protective seat belt arrangement of the nature to which the present invention generally appertains is shown provided in an automotive vehicle having a vehicle body 1 including a front door structure 2, a roof panel 3, a roof side rail 4, a head lining 5, a center pillar 6, a rear pillar 7, and front and rear seat structures 8 and 9. In the vehicle body 1 thus constructed, the prior-art seat belt arrangement comprises a guide rail 11 which is fixedly attached to the roof side rail 4 by means of screws 12. The guide rail 11 longitudinally extends in a fore-and-aft direction of the vehicle body 1 and is formed with a groove which is open downwardly as indicated at 13 in FIG. 2. A slide member 14 has a sliding portion 14a slidably received in the groove in the guide rail 11 and an arm portion 14b protruding downwardly from the guide rail 11 through the open lower end of of the groove in the rail 11. The slide member 14 is connected at the leading, viz., lower end thereof to an emergency release buckle 15, which in turn is coupled to a tongue member 16. A retaining strap 17 is anchored at one end thereof to the tongue member 16 and at the end thereof to a retractor unit 18 which is secured to the floor panel or to the front seat structure 8. The retractor unit 18 is adapted to pull the retaining strap 17 and to have the retaining strap 17 wound into roll form therein. A geared wire or flexible rack member 19 is connected at one end thereof to the sliding portion 14a of the above mentioned slide member 14 and is engaged by a pinion (not shown) mounted on the output shaft of a reversible electric motor 20. The flexible rack member 19 is longitudinally slidable through a rigid guide tube (not shown). When the motor 20 is in operation, the flexible rack member 19 is thus driven to longitudinally move through the guide tube forwardly or backwardly as indicated by arrowhead a or a' in FIG. 1. Though not shown in the drawings, the motor 20 is electrically connected to a power source across a switch responsive to movement of the door structure 2 of the vehicle body 1.

When the motor 20 is at rest, the sliding portion 14a of the slide member 14 is located at the rear end of the guide rail 11 so that the retaining strap 17 is maintained in a position capable of retaining an occupant S of the seat structure 8 as indicated by full lines in FIG. 1. When the door structure 2 is made open, the switch for the motor 20 assumes a position causing the motor 20 to drive the flexible rack member 19 for forward movement in the direction of the arrowhead a with respect to the vehicle body 1. The slide member 14 is consequently driven to move forwardly through the groove 5 in the guide rail 11 to the front end of the guide rail 11 so that the retaining strap 17 is moved forwardly away from the seat back of the seat structure 8 to a position allowing an occupant of the seat structure 8 to enter the vehicle and sit on the seat structure 8 as indicated by dots-and-dash lines in FIG. 1. When the door structure 2 is thereafter closed, the switch for the motor 20 assumes a position causing the motor 20 to drive the flexible rack member 19 for rearward movement in the direction of the arrowhead a' with respect to the vehicle body 1. The slide member 14 is now driven to move rearwardly through the groove in the guide rail 11 to the rear end of the guide rail 11 so that the retaining strap 17 is moved backwardly toward the seat back of the seat structure 8 to the initial position capable of retaining the occupant S of the seat structure 8 as shown in the full lines in FIG. 1. Until the door structure 2 is made open for a second time, the slide member 14 is maintained in the position having the sliding portion located at the rear end of the guide rail 11 by a suitable locking device 21 mounted on the guide rail 11 as shown in FIG. 1.

When the seat belt arrangement constructed and arranged as described above is held in a condition having the retaining strap 17 stretched on the occupant S of the seat structure 8, the retaining strap 17 may be forced into contact with the neck of the seat occupant S as indicated by dots-and-dash lines in FIG. 2 due to a tension produced in the retaining strap 17. With a view to preventing an occupant of the seat structure 8 from having his neck thus caught by the the retaining strap 17, a strap guide member 22 is fixedly attached in part to the inner member 4a of the roof side rail 4 by means of a bolt 23 and a nut 24 and in part to the inner member 6a of the center pillar 6 by means of a bolt 23' and a nut 24' as shown in FIGS. 1 and 2. The strap guide member 22 extends in part vertically along the center pillar 6, straddling over the guide rail 11 as shown in FIG. 2. The arm portion 14a of the slide member 14 extends through a gap formed between the the strap guide member 22 and the inner member of the center pillar 6 so that the retaining strap 17 anchored to the arm portion 14b through the buckle 15 and the tongue member 16 is correctly attached to the seat occupant's bust and shoulder and is thus kept away from his neck as indicated by full lines in FIG. 2.

In the prior-art protective seat belt arrangement of the nature above described, problems are encountered since the strap guide member 22 extends upwardly beyond the guide rail 11 and is fastened at the upper end thereof to an upper end portion of the roof side rail 4. In order that the strap guide member 22 is permitted to extend above the guide rail 11, it is required to have the head lining 5 partially raised from a plane 5' on which the head lining 5 is to be usually located. The head lining 5 is for this reason partially deformed in the neighborhood of the strap guide member 22 and can not extend uniformly below the roof panel 2. To avoid such a problem or if the vehicle is of the type or model having no room to permit the strap guide member 22 to be connected to the roof side rail 4 above the guide rail 11, the strap guide member 22 must be cantilevered, viz., secured only at the lower end thereof to the center pillar 6. Thus, the strap guide member 22 can not be fixed firmly and stably to the vehicle body 1 and may be deformed when forcefully pressed upon by the retaining strap 17 which is stretched tautly against the seat occupant's bust and shoulder. The present invention contemplates elimination of these problems encountered in a prior-art seat belt arrangement of the described nature.

DESCRIPTION OF THE PREFERRED EMBODIMENT

Referring to FIGS. 3 and 4 of the drawings, a protective seat belt arrangement embodying the present invention is shown provided in an automotive vehicle similar to that described with reference to FIGS. 1 and 2 and thus having a vehicle body 1 including a front door structure 2, a roof panel 3, a roof side rail 4, a head lining 5, a center pillar 6, a rear pillar 7, and front and rear seat structures 8 and 9. The roof side rail 4 longitudinally extends along each side edge of the roof panel 3 and is composed of inner and outer members 4a and 4b. The inner and outer members 4a and 4b of the roof side rail 4 are fastened to each other along upper and lower edges of the rail 4 and are trimmed with a welt 10 along the lower edge of the rail 4 as indicated in FIG. 4. The head lining 5 is formed of, for example, cloth and covers the inner surface of the roof panel 3. The center pillar 6 is located adjacent the rear end of the front door structure 2 and longitudinally extends vertically between the roof side rail 4 and a side sill (not shown) extending along each side edge of the floor panel (not shown) of the vehicle body 1. The center pillar 6 is composed of inner and outer members 6a and 6b and a center pillar trim 6c. The inner and outer members 6a and 6b of the center pillar 6 are securely attached along their respective upper edges to the inner and outer members 4a and 4b, respectively, of the roof side rail 4, while the center pillar trim 6c is attached to the inner surface of the inner member 6a. The rear pillar 7 longitudinally extend vertically between the roof side rail 4 and a rear wheel house structure (not shown) of the vehicle body 1 and is also composed of inner and outer members and a rear pillar trim attached to the inner member, though not shown in the drawings.

In the vehicle body 1 thus constructed, the protective seat belt arrangement embodying the present invention is also assumed, for purposes of description, as being provided in conjunction with the front seat structure 8 but may apparently be provided in conjunction with the rear seat structure 9 or any other seat structure installed in an automotive vehicle. The seat belt arrangement comprises a guide rail 11 which is fixedly attached to the roof side rail 4. The guide rail 11 longitudinally extends in a fore-and-aft direction of the vehicle body 1 and is formed with a longitudinal groove which is open downwardly as indicated at 13 in FIG. 4 and to an enlarged scale in FIG. 5. The guide rail 11 has an upper strip portion or projection 11a which is elongated throughout the length of the guide rail 11 and which is fixedly attached to the inner member 6a of the center pillar 6 through the center pillar trim 6c. A slide member 14 has a sliding portion 14a slidably received in the groove in the guide rail 11 and an arm portion 14b protruding downwardly from the guide rail 11 through the open lower end of of the groove in the rail 11. The slide member 14 is connected at the leading, viz., lower end thereof to an emergency release buckle 15, which in turn is coupled to a tongue member 16. A retaining strap 17 is anchored at one end thereof to the tongue member 16 and at the other end thereof to a retractor unit 18 and longitudinally extends obliquely in front of the seat back of the seat structure 8. The retractor unit 18 is secured to the floor panel or to the front seat structure 8 and is adapted to pull the retaining strap 17 and to have the retaining strap 17 wound into roll form therein. A geared wire or flexible rack member 19 is connected at one end thereof to the sliding portion 14a of the above mentioned slide member 14 and is engaged by a pinion (not shown) mounted on the output shaft of a reversible electric motor 20. The flexible rack member 19 is composed, by way of example, of a core wire and a coil wire helically wound on the core wire and is longitudinally slidable through a rigid guide tube (not shown). When the motor 20 is in operation, the flexible rack member 19 is thus driven to longitudinally move through the guide tube forwardly or backwardly as indicated by arrowhead a or a' in FIG. 3. Though not shown in the drawings, the motor 20 is electrically connected to a power source across a switch responsive to movement of the door structure 2 of the vehicle body 1 as in the prior-art protective seat belt arrangement described with reference to FIGS. 1 and 2. The flexible rack member 19 and the motor 20 form part of drive means of the seat belt arrangement embodying the present invention.

When the motor 20 is at rest, the sliding portion 14a of the slide member 14 is located at the rear end of the guide rail 11 so that the retaining strap 17 is maintained in a position capable of retaining an occupant S of the seat structure 8 as indicated by full lines in FIG. 3. When the door structure 2 is made open, the switch for the motor 20 assumes a position causing the motor 20 to drive the flexible rack member 19 for forward movement in the direction of the arrowhead a with respect to the vehicle body 1. The slide member 14 is consequently driven to move forwardly through the groove in the guide rail 11 to the front end of the guide rail 11 so that the retaining strap 17 is moved forwardly away from the seat back of the seat structure 8 to a position allowing an occupant of the seat structure 8 to enter the vehicle and sit on the seat structure 8 as indicated by dots-and-dash lines in FIG. 3. When the door structure 2 is thereafter closed, the switch for the motor 20 assumes a position causing the motor 20 to drive the flexible rack member 19 for rearward movement in the direction of the arrowhead a' with respect to the vehicle body 1. The slide member 14 is now driven to move rearwardly through the groove in the guide rail 11 to the rear end of the guide rail 11 so that the retaining strap 17 is moved backwardly toward the seat back of the seat structure 8 to the initial position capable of retaining the occupant S of the seat structure 8 as shown in the full lines in FIG. 3. Until the door structure 2 is made open for a second time, the slide member 14 is maintained in the position having the sliding portion located at the rear end of the guide rail 11 by a suitable locking device 21 mounted on the guide rail 11 as shown in FIG. 3.

In order to prevent an occupant S of the seat structure 8 from having his neck thus caught by the the retaining strap 17, a rigid strap guide member 25 is provided which has an upper bracket portion 25a and a lower strip portion 25b extending downwardly from the upper bracket portion 25a along the center pillar 6. The strap guide member 25 is preferably generally T-shaped and, thus, the upper bracket portion 25a thereof is elongated along the guide rail 11 as will be best seen from FIG. 3. The strap guide member 25 thus configured has its the upper bracket portion 25a fixedly attached to the inner member 4a of the roof side rail 4 through the above mentioned upper projection 11a of the guide rail 11 and the inner member 6a of the center pillar 6 by suitable fastening means such as bolts 26 and nuts 27 as shown. The strap guide member 25 is further fixedly attached adjacent the lower end of the lower strip portion 25b thereof to the inner member 6a of the center pillar 6 through the center pillar trim 6c by suitable fastening means such as a bolt 26' and a nut (not shown) as indicated by broken lines in FIG. 4. The guide rail 11 is closely received between the inner member 6a of the center pillar 6 and the upper bracket portion 25a of the strap guide member 25 as will be best seen from FIG. 5. The bolts 26 and nuts 27 in the embodiment of the present invention are thus used for securing not only the strap guide member 25 but the guide rail 11 to the center pillar 6. The arm portion 14b of the slide member 14 extends through a gap formed between the strap guide member 25 and the inner member 6a of the center pillar 6 so that the retaining strap 17 anchored to the arm portion 14b through the buckle 15 and the tongue member 16 is correctly attached to the seat occupant's bust and shoulder and is thus kept away from his neck. If desired, the lower strip portion 25b of the strap guide member 25 may be at least in part covered with a molding 28 of a synthetic resin.

The strap guide member 25 of the protective seat belt arrangement embodying the present invention is thus firmly and stably secured to the vehicle body 1 at a number of points and is for this reason prevented from being deformed when forcefully pressed upon by the retaining strap 17 which is tensioned against the seat occupant's bust and shoulder. Since the guide rail 11 is closely received between the inner member 6a of the center pillar 6 and the upper bracket portion 25a of the strap guide member 25 as above described, the strap guide member 25 further serves to prevent the guide rail 11 from being deformed to have its open lower end 13 expanded by the slide member 14 which is urged downwardly by the retaining strap 17 when the retaining strap 17 is tensioned. Because, furthermore, of the fact that the upper bracket portion 25a of the strap guide member 25 upwardly terminates below the upper end of the guide rail 11 so that the strap guide member 25 has no portion protruding upwardly beyond the guide rail 11, the head lining 5 can be arranged to extend correctly on the plane 5' throughout the area of the lining 5.

What is claimed is:

1. A protective seat belt arrangement for use in an automotive vehicle including a seat structure, a first structural member longitudinally extending in a fore-and-aft direction of the vehicle, a second structural member extending downwardly from the first structural member, and a stationary member fixedly held in the vehicle body, the seat belt arrangement comprising
   a guide rail longitudinally extending along and fixedly attached by first fastening means to said first structural member and formed with a longitudinal groove which is open downwardly;
   a slide member in part slidably received in the groove in said guide rail and in part protruding downwardly from the guide rail through the open lower end of the groove in the guide rail;

a retaining strap anchored at one end thereof to said slide member and longitudinally extending in part in front of the seat back of said seat structure;

a retractor unit secured to said stationary member and adapted to pull the retaining strap and to have the retaining strap wound into roll form therein, said retaining strap being anchored at the other end thereof to the retractor unit;

drive means operable for driving the slide member to move forwardly and rearwardly through the groove in said guide rail; and a strap guide member having an upper bracket portion fixedly attached to said first structural member by second fastening means with a portion of said guide rail closely held between the bracket portion and the first structural member and a lower strip portion extending downwardly from the upper bracket portion along said second structural member and fixedly attached to the second structural member, the arm portion of the slide member extending through a gap formed between the second structural member and the lower strip portion of the strap guide member the upper bracket portion of the strap guid member upwardly terminating below the upper end of said first structural member, said second fastening means having not only said strap guide member but also said guide rail secured to said first structural member.

2. A protective seat belt arrangement as set forth in claim 1, in which the upper bracket portion of said strap guide member is elongated along the guide rail and in which said guide rail has a longitudinal portion closely received between said second structural member and the upper bracket portion of the strap guide member.

3. A protective seat belt arrangement as set forth in claim 1 or 2, further comprising a molding of a synthetic resin with which said lower strip portion of the strap guide member is at least in part covered.

4. A protective seat belt arrangement as set forth in claim 3, in which each of said first and second structural members is composed of inner and outer members which are secured together, the upper bracket portion of said strap guide member being secured to the inner member of said first structural member through said portion of the guide rail and the lower strip portion of said strap guide member being secured to the inner member of the second structural member.

5. A protective seat belt arrangement as set forth in claim 4, in which said first structural member is constituted by a roof side rail longitudinally extending along each side edge of the roof panel of the vehicle and said second structural member is constituted by a center pillar extending downwardly from the roof side rail.

* * * * *